United States Patent [19]
Hoehner et al.

[11] Patent Number: 5,386,972
[45] Date of Patent: Feb. 7, 1995

[54] SPRING ARRANGEMENT FOR A WHEELCHAIR

[75] Inventors: Peter Hoehner, Stemshorn; Josef Dultmeyer, Steinfeld; Michael Wahle, Wachenheim, all of Germany

[73] Assignee: Elastogram GmbH, Lemforde, Germany

[21] Appl. No.: 60,973

[22] Filed: May 14, 1993

[30] Foreign Application Priority Data

May 27, 1992 [DE] Germany .............. 4217536

[51] Int. Cl.6 .............. F16M 7/00; A61G 5/02
[52] U.S. Cl. .................. 267/140; 267/293; 280/250.1
[58] Field of Search ........... 267/136, 139, 140, 140.4, 267/141.2, 152, 153; 280/250.1, 304.1, 716

[56] References Cited

U.S. PATENT DOCUMENTS

| | | | |
|---|---|---|---|
| 3,794,277 | 2/1974 | Smedley et al. | 267/141 |
| 4,078,817 | 3/1978 | Ferguson et al. | 267/249 |
| 4,085,832 | 4/1978 | Gaines et al. | 267/140 |
| 4,475,722 | 10/1984 | Patan et al. | 267/202 |
| 4,572,535 | 2/1986 | Ellis et al. | 280/250.1 |

FOREIGN PATENT DOCUMENTS 3739216 4/1988 Germany .

*Primary Examiner*—Robert J. Oberleitner
*Assistant Examiner*—Chris Schwartz
*Attorney, Agent, or Firm*—Keil & Weinkauf

[57] ABSTRACT

A spring element (7) acting in the vertical direction on the rear wheels (12) of a wheelchair is connected on the one hand via a supporting tube (3) to the frame (1) of the wheelchair and on the other hand via a supporting tube (5) for the wheel axle bearing (6) to the wheel axle. The superposed supporting tubes (3, 5) are arranged coaxially with respect to a guide rod (2) fastened on the wheelchair frame (1) and thereby enclose the spring element (7).

3 Claims, 1 Drawing Sheet

SPRING ARRANGEMENT FOR A WHEELCHAIR

DESCRIPTION

The invention relates to a spring arrangement for a wheelchair, comprising a spring element which is connected on the one hand via a support to the frame of the wheelchair and on the other hand via a bearing support to the wheel axle.

DE-A-37 39 216 discloses a shock absorber arrangement for wheelchairs in which a vertically movable slide for receiving the wheel axle is connected via an upper and a lower spring part to an upper and lower support, fastened on a side frame of the wheelchair. Depending on the direction of movement, the upper or lower spring part is compressed.

The side frame construction necessary for the shock absorber arrangement results in a wider wheel track than an unsprung wheelchair, a disadvantage when going through confined spaces, such as doors or passages. Furthermore, the open design gives rise to the risk of hand injuries.

It is an object of the present invention to develop an encapsulated spring arrangement for a wheelchair which does not require the outer dimensions of the wheelchair to be altered for it to be fitted.

We have found that this object is achieved by a spring arrangement of the type described at the beginning in which, according to the invention, both the support on the frame side and the support on the axle bearing side are tubular parts and, like the spring element, are arranged coaxially with respect to a guide rod fastened on frame members, the support on the bearing side being axially movable and rotationally immovable due to positive connection to the guide rod, and the superposed supports enclosing the spring element received in a pot-shaped widening of the support on the frame side.

Further details and advantages of the spring arrangement according to the invention are included in the following description of an exemplary embodiment represented diagrammatically in the drawing, in which.

Figure 1:
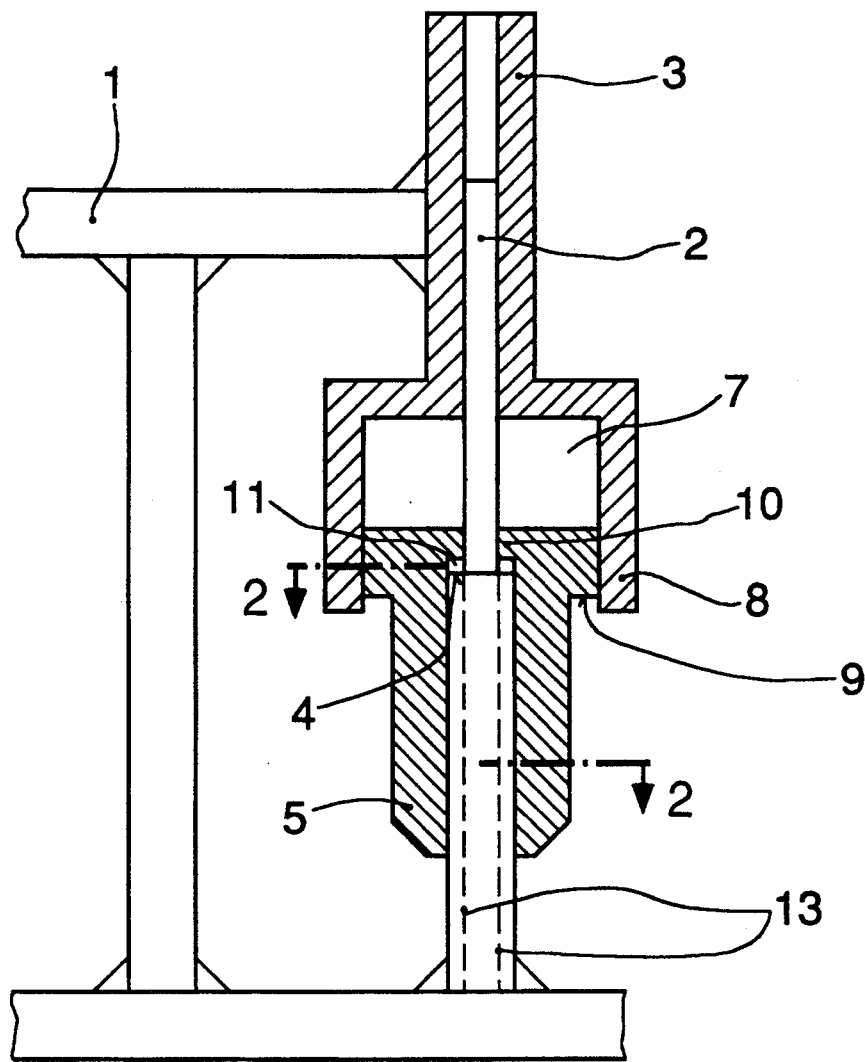
FIG. 1 shows the spring arrangement in a longitudinal section
Figure 2:
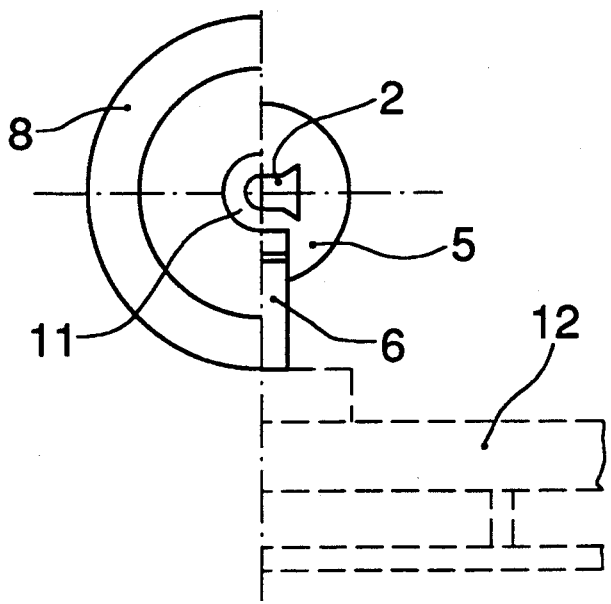
FIG. 2 shows the spring arrangement in a cross section along the line of intersection A—A in FIG. 1.

On existing frame members or parts 1 (FIG. 1) of the wheelchair, a guide rod 2 is fastened in upright position at its upper end with a supporting tube 3 interposed and at its lower end in a direct manner. The guide rod is divided at a step 4 into an upper part with the surrounding supporting tube 3 and a lower part with a non-circularly round or interrupted round cross section, for example a cross section 13 which is oval or round with axially parallel grooves or projections or is square (FIG. 2). Arranged coaxially with respect to the lower part is a second axially displaceable supporting tube 5 having an adapted inner profile, in which the bearing 6 for the wheel axle is received. The superposed supporting tubes 3 and 5 enclose a likewise coaxially arranged elastomer part 7 as spring element, which is enclosed by a pot-shaped widening 8 of the supporting tube 3. In this arrangement, said widening passes telescopically over the supporting tube 5 on the bearing side on an outer peripheral projection 9, so that the spring element is closed off from the outside.

The supporting tube 5 has above the step 4 of the guide rod 2 an inner projection 10, which passes over the step and encloses with the step a flexible ring 11, so that a resilient stop is formed.

Elastomers, such as rubber or foamed plastics, but preferably a cellular polyurethane elastomer are suitable as material for the spring. With this material it is possible to obtain given characteristics by adapting the encapsulated spring and the density of the spring material. In addition, with this design high specific forces can be absorbed. For example, a progressive characteristic with adequate damping can be set, thereby improving distinctly the running stability and running behavior in comparison with the use of springs having an approximately linear characteristic.

In the event of impact on the two rear wheels 12 of the wheelchair, the elastomeric spring part 7 of the spring arrangement fitted on both sides is compressed and consequently the impact is to a great extent absorbed. During rebound, the downward movement of the supporting tube 5 on the axle bearing side is absorbed by the flexible stop 11. Due to the profile of guide rod 2 in the lower part and supporting tube 5, rotary movements owing to the wheel forces and torques are in this case prevented.

The construction described above of the spring arrangement proposed by the invention exhibits the advantages summarized below:

compact design which can be integrated into the existing frame system;

good damping behavior of the encapsulated spring;

pronounced progression of the spring characteristic, which benefits running stability, and easy adaptability to variable weights and spring excursions.

We claim:

1. A spring arrangement in combination with a wheelchair said wheelchair comprising a frame and a wheel axle, said spring arrangement comprising a spring element with a progressive force-deflection characteristic, good damping and the ability to absorb high specific forces, which is connected on the one hand via a support to the frame of the wheelchair and on the other hand via a supporting tube acting as a bearing support to the wheel axle, wherein both the support on the frame side and the bearing support on the axle bearing side are tubular parts and, like the spring element, are arranged coaxially with respect to a guide rod fastened on frame members, said guide rod having, in the region where it passes through the bearing support, a non-circular cross-section, the bearing support being axially movable and rotationally immovable due to its being closely adapted to the non-circular cross-section of the guide rod, and the superposed supports enclosing the spring element received in a pot-shaped widening of the support on the frame side, said pot-shaped widening closely overlapping at least part of the bearing support so as to close the spring element off from the outside.

2. The spring arrangement as claimed in claim 1, wherein the spring element comprises a cellular polyurethane elastomer.

3. The spring arrangement as claimed in claim 1, wherein the guide rod has for forming a stop for the bearing support on the axle bearing side a step which is is covered by a flexible ring, and the bearing support is provided with a corresponding inner projection.

* * * * *